United States Patent
Damm et al.

(10) Patent No.: US 8,487,262 B2
(45) Date of Patent: Jul. 16, 2013

(54) RADIOMETRIC MEASURING DEVICE

(75) Inventors: Hartmut Damm, Schopfheim (DE); Jochen Politt, Rheinfelden (DE); Simon Weidenbruch, Lorrach (DE); Mingzehn Jiang, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 351 days.

(21) Appl. No.: 12/734,544
(22) PCT Filed: Nov. 7, 2008
(86) PCT No.: PCT/EP2008/065138
§ 371 (c)(1), (2), (4) Date: May 7, 2010
(87) PCT Pub. No.: WO2009/060070
PCT Pub. Date: May 14, 2009

(65) Prior Publication Data
US 2010/0252739 A1 Oct. 7, 2010

(30) Foreign Application Priority Data

Nov. 9, 2007 (DE) .......................... 10 2007 053 860

(51) Int. Cl.
G01F 23/288 (2006.01)
(52) U.S. Cl.
USPC ...................................... 250/357.1
(58) Field of Classification Search
CPC ............................ G01F 23/288; G01F 23/0061
USPC ...................................... 250/357.1
See application file for complete search history.

(56) References Cited

U.S. PATENT DOCUMENTS

| | | | |
|---|---|---|---|
| 6,014,100 A | 1/2000 | Fehrenbach | |
| 6,879,425 B2 * | 4/2005 | Damm et al. ................. | 359/272 |
| 4,520,266 A * | 5/1985 | Fletcher et al. ............ | 250/357.1 |

(Continued)

FOREIGN PATENT DOCUMENTS

CN 87106698 A 3/1988

(Continued)

OTHER PUBLICATIONS

David F. Spencer et al., "Using the Cockroft-Walton Voltage Multiplier with Small Photomultipliers", IEEE Transactions on Nuclear Science, New York, Bd. 49, Nr. 3, Jun. 2002.
English translation of IPR, Jun. 10, 2010, Geneva.
German Search Report, Nov. 11, 2007, Munich.
International Search Report, Feb. 6, 2009, The Netherlands.

* cited by examiner

Primary Examiner — Constantine Hannaher
(74) Attorney, Agent, or Firm — Bacon & Thomas, PLLC

(57) ABSTRACT

A radiometric for measuring a physical, measured variable of a fill substance located in a container and for outputting a measurement signal, which corresponds to a measured value of the physical, measured variable. The measuring device has available a single line-pair, via which energy supply of the total measuring device occurs, and via which transmission of the measurement signal occurs. The measuring device includes: a radioactive radiator, which, during operation, sends radioactive radiation through the container; a detector having a scintillator and a photomultiplier and serving for detecting, and for converting into an electrical output signal, radiation intensity penetrating through the container dependent on the physical, measured variable to be measured; a measuring device electronics, which serves, on the basis of the electrical output signal of the detector, for producing the measurement signal and for making such available via the line-pair; an energy storer supplied via the line-pair; a controller, which, as a function of energy available via the line-pair and the energy storer, triggers measuring phases, during which the measuring device measures the physical, measured variable, and which places the photomultiplier in operation exclusively during the measuring phases, wherein high voltages required for operating the photomultiplier are produced during the measuring phases by means of a high voltage cascade.

17 Claims, 3 Drawing Sheets

| U.S. PATENT DOCUMENTS | | | |
|---|---|---|---|
| 8,084,740 B2 * | 12/2011 | Rauer et al. | 250/357.1 |
| 2004/0025569 A1 | 2/2004 | Damm | |
| 2004/0061537 A1 | 4/2004 | Flasza | |
| 2004/0074295 A1 * | 4/2004 | Michalski et al. | 73/290 R |
| 2004/0128098 A1 | 7/2004 | Neuhaus | |
| 2006/0122811 A1 | 6/2006 | Kirst | |
| 2007/0278404 A1 | 12/2007 | Spanke | |

| FOREIGN PATENT DOCUMENTS | | |
|---|---|---|
| CN | 1473264 A | 2/2004 |
| CN | 1914488 A | 2/2007 |
| DE | 2008 411 | 9/1971 |
| DE | 101 04 165 A1 | 9/2002 |
| DE | 10 2004 007 680 A1 | 9/2005 |
| WO | WO 02/18883 A2 | 3/2002 |
| WO | WO 2004/015646 A2 | 2/2004 |

RADIOMETRIC MEASURING DEVICE

TECHNICAL FIELD

The invention relates to a radiometric measuring device having a radioactive radiator and a detector for registering a radiation intensity falling on the site of the detector.

BACKGROUND DISCUSSION

By means of radiometric measuring devices, physical variables, such as e.g. a fill level of a fill substance in a container, an exceeding or subceeding of a predetermined fill level of a fill substance in a container, or a density of a medium, are measurable.

Radiometric measuring devices are applied, usually, when conventional measuring devices are not applicable due to especially difficult conditions at the measuring location. Very frequently, there reigns at the measuring location e.g. extremely high temperatures and pressures or chemically and/or mechanically very aggressive environmental influences, which make the use of other measuring methods impossible.

In radiometric measurements, a radioactive radiator, e.g. a Co 60 or Cs 137 preparation, is placed in a radiation protection container at a measuring location, e.g. a container containing a fill substance. Such a container can be e.g. a tank, a pipe, a conveyor belt or any other form of Containment.

The radiation protection container includes a passageway, through which radiation emitted from the radiator positioned for measurement is radiated through a wall of the radiation protection container.

Usually, a radiation direction is selected, such that the radiation penetrates that region of the container, which should be scanned for measurements reasons. On the oppositely lying side, the emerging radiation intensity changed by a fill level, or density, change is quantitatively registered with a detector. The emerging radiation intensity depends on the geometric arrangement and on absorption. The latter is, in the case of fill level measurement and in the case of monitoring of an exceeding, or subceeding (falling beneath), of a predetermined fill level, dependent on the amount of the fill substance in the container and, in the case of the density measurement, on the density of the fill substance. As a result, the emerging radiation intensity is a measure for the current fill level, the exceeding, or subceeding (falling beneath), of the predetermined fill level, or the current density of the fill substance in the container.

Suited as detector is e.g. a scintillation detector having a scintillator, e.g. a scintillation rod, and a photomultiplier. The scintillation rod is composed of a special synthetic material, such as e.g. polystyrene (PS) or polyvinyl toluene (PVT), which is optically very pure. Under the influence of gamma radiation, light flashes are emitted by the scintillation material. These are registered by the photomultiplier and converted into electrical pulses. A pulse rate, with which the pulses occur, depends on the radiation intensity and is, thus, a measure for the physical variable to be measured, e.g. the fill level or the density. Scintillator and photomultiplier are usually mounted in a protective tube, e.g. of stainless steel.

The measuring device includes, associated with the detector, a measuring device electronics, which produces an output signal corresponding to the pulse rate. The measuring device electronics comprises, usually, a controller and a counter. The electrical pulses are counted and a counting rate derived, on the basis of which the physical variable to be measured is ascertainable. The ascertaining of the measured variable occurs, for example, by means of a microprocessor provided in the electronics and is made available by the measuring device in the form of a measurement signal. The measurement signal is, for example, supplied to a superordinated unit, e.g. a programmable logic controller (PLC), a process control system (PCS) or a personal computer (PC).

In measuring, and control, technology, preferably measuring devices with only one line pair are applied, via which both the supplying of the measuring device with energy, or power, as well as also the signal transmission occurs. These devices are frequently referred to as 2-wire, measuring devices.

According to standard, such measuring devices are supplied with 10 V to 12 V and the measuring device controls an electrical current flowing through the line-pair as a function of an instantaneous, measured value. The measurement signal is, in the case of these measuring devices, an electrical current. In a standard, which is usual in measuring, and control, technology, the electrical current is set as a function of the instantaneous measured value to values between a minimum electrical current of 4 mA and a maximum electrical current of 20 mA. These devices offer the advantage, that, due to the small energy supply, they can be used also in explosion endangered areas, where an intrinsically safe, electrical current supply is required.

Since both the supplying of energy, or power, as well as also signal transmission occurs via the line-pair, the measuring device has available, in the case of a supply voltage of 12 V and an electrical current of 4 mA, a power of only 48 mW.

In the case of another variant of these 2-wire measuring devices, the devices are connected via a bus, via which both the supplying of the measuring device with energy, or power, as well as also the signal transmission occurs. Also for this variant, corresponding industrial standards have become common, such as e.g. the Profibus and Foundation Fieldbus standards. Also in the case of these 2-wire, bus devices, as a rule, only very little energy is available for operating the measuring device. Typically, the terminal voltage here amounts to 10 V and an average electrical current of 9 mA flows. The available power lies therewith around 90 mW.

Conventional radiometric measuring devices require, however, especially for supplying the photomultiplier with high voltage, very much more energy than is available for 2-wire measuring devices.

For operating the photomultiplier, a high voltage of up to 2000 V is required. Usually, this high voltage is produced by means of a DC/DC converter and distributed via a voltage divider, e.g. a resistance chain, to the individual dynodes of the photomultiplier. For this purpose, preferably very high ohm, voltage dividers are applied. However, even in such case, cross-current flows through the voltage divider, which, compared to the actual electrical current requirement of the photomultiplier, leads to considerable energy losses.

In order that these measuring devices, in spite of this, can be used in connection with the earlier described standards, these measuring devices, usually, have two line-pairs. Via one of the line-pairs, the measuring device is supplied with energy, or power, and via the other there flows an electrical current corresponding to the earlier described standard. For the power supply, it is usually required, in the case of the normal electrical supply line delivering e.g. 230 V alternating voltage, to provide a transformer and a rectifier, in order to obtain e.g. a supply voltage of, usually, 24 V direct voltage for the measuring device. This is very complicated and there is danger that the two line-pairs can be switched, one for the other, in the connecting of the device.

There are also radiometric measuring devices on the market, in the case of which the detector and the associated measuring device electronics are elements separated from one another, which are, in such case, supplied with energy separately from one another.

SUMMARY OF THE INVENTION

It is an object of the invention to provide a radiometric measuring device using a single line-pair, via which there occurs both the supplying of the total measuring device with energy, or power, as well as also the transmission of the measurement signal.

For this, the invention resides in a radiometric measuring device for measuring a physical, measured variable of a fill substance located in a container and for outputting a measurement signal, corresponding to a measured value of the physical, measured variable, wherein the device has available a single line-pair, via which energy supply of the total measuring device occurs, and via which transmission of the measurement signal occurs, and wherein the device includes:
a radioactive radiator, which, during operation, sends radioactive radiation through the container;
a detector having a scintillator and a photomultiplier and serving for detecting, and for converting into an electrical output signal, radiation intensity penetrating through the container dependent on the physical, measured variable to be measured;
a measuring device electronics, which serves for producing the measurement signal on the basis of the electrical output signal of the detector and for making the measurement signal available via the line-pair;
an energy storer supplied with energy via the line-pair; and
a controller, which triggers, as a function of energy available via the line-pair and the energy storer, measuring phases, during which the measuring device measures the physical, measured variable, and which places the photomultiplier in operation exclusively during the measuring phases, wherein high voltages required for operating the photomultiplier are produced during the measuring phases by means of a high voltage cascade.

In a first embodiment, there is provided, connected to the line-pair, a measurement circuit, which measures available input electrical current and input voltage.

In a second embodiment, an energy measurement line is provided, via which energy available internally in the measuring device via the line-pair and the energy storer is registered.

In a further development, charge status of the energy storer is registered, and the measuring phases are triggered as a function of the charge status of the energy storer.

In an additional embodiment, the measuring device electronics includes a microcontroller, which is switched off, or operated with a reduced clocking rate, during measuring pauses.

In a further development, the measurement signal is an electrical current, which varies between a minimum current and a maximum current as a function of the measured value, wherein associated with the minimum current is that measured value, in the case of which, within a predetermined measuring range of the measuring device, the highest radiation intensity is present.

In an additional further development, the measurement signal is an electrical current, which varies between a minimum current and a maximum current as a function of the measured value, and the ratio of the duration of the measuring phases to the duration of the measuring pauses increases with increasing electrical current of the signal.

In an additional further development, the measurement signal is an electrical current, which varies between a minimum current and a maximum current as a function of the measured value, and the duration of the measuring phases increases with increasing electrical current of the signal.

In an embodiment, the measurement signal is a bus signal.

In a further development, a counter is provided, which counts pulses produced by the photomultiplier, and the duration of the measuring phases is dimensioned in such a manner that, during a measuring phase, at least a predetermined minimum number of pulses is produced.

Additionally, the invention resides in a method for operation of a radiometric measuring device of the invention, wherein the measurement signal is an electrical current, which varies between a minimum current and a maximum current as a function of the measured value, and the electrical current, at turn-on of the measuring device, is controlled to the maximum current.

Additionally, the invention resides in a method for operation of a radiometric measuring device of the invention, wherein the measurement signal is an electrical current, which varies between a minimum current and a maximum current as a function of the measured value, and wherein the electrical current is controlled in calibration operation to a value of greater than 20.5 mA, especially to 22 mA.

Additionally, the invention resides in a method for operation of a radiometric measuring device of the invention, wherein
the measurement signal is an electrical current, which varies between a minimum current and a maximum current as a function of the measured value,
the electrical current is controlled, in the case of the presence of a device error, to an error value of less than 3.8 mA, especially to 3.6 mA, and
the controller effects, during the presence of a device error, a measuring pause lasting for the duration of the presence of the device error.

In an embodiment of the invention, the ratio of the duration of the measuring phases to the duration of the measuring pauses lies, dependent on available energy, between 20% and 100%.

Additionally, the invention resides in a method for operation of a measuring device of the invention, wherein
available input voltage is measured,
the input voltage is compared with a minimum voltage required for continuous operation of the measuring device, and
the controller, in the case of exceeding of the minimum voltage, triggers a measuring phase, which ends, only when the input voltage sinks below the minimum voltage.

BRIEF DESCRIPTION OF THE DRAWINGS

The invention and other advantages will now be explained in greater detail on the basis of the figures of the drawing, in which an example of an embodiment is presented; equal parts are provided in the figures with equal reference characters. The figures of the drawing show as follows.

DETAILED DISCUSSION IN CONJUNCTION WITH THE DRAWINGS

Figure 1:
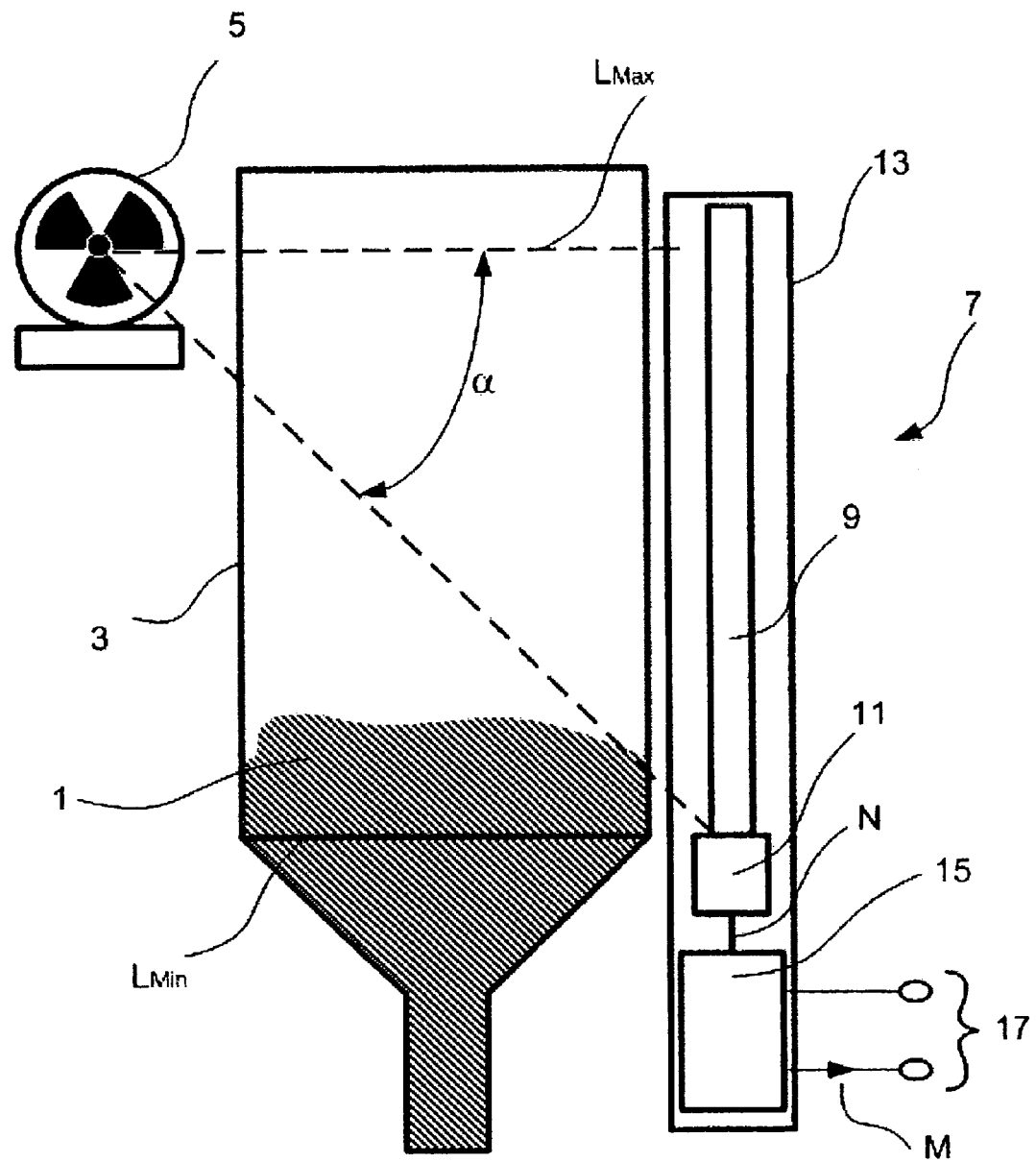
FIG. 1 shows schematically, a radiometric measuring device mounted at a container.

FIG. 1 shows schematically a measuring arrangement having a radiometric measuring device. The radiometric measuring device serves for measuring a physical, measured variable and for outputting a measurement signal M, which corresponds to a measured value of the physical, measured variable. The measuring arrangement includes a container 3 fillable with a fill substance 1. The radiometric measuring device is mounted at the container 3. The physical, measured variable is e.g. a fill level of the fill substance 1 in the container 3 or a density of the fill substance 1.

The radiometric measuring device includes a radioactive radiator 5, which, during operation, sends radioactive radiation through the container 3. The radiator 5 is composed e.g. of a radiation protection container in which a radioactive preparation, e.g. a Co 60 or Cs 137 preparation, is placed. The radiation protection container has an opening, through which the radiation escapes at an aperture angle alpha and irradiates the container 3.

The measuring device includes a detector 7, which serves for registering radiation penetrating through the container 3 and for detecting a radiation intensity dependent on the physical, measured variable to be measured and for converting such into an electrical output signal N. The detector 7 is a scintillation detector having a scintillator 9, here a scintillation rod, and a photomultiplier 11 connected thereto. Scintillator 9 and photomultiplier 11 are located in a protective tube 13 illustrated in FIG. 1, e.g. a tube of stainless steel, which is mounted on an outer wall of the container 3, lying opposite the radiator 5. Radiometric radiation reaching the scintillator 9 produces light flashes in the scintillation material. These are registered by the photomultiplier 11 and converted into electrical pulses, which are available as electrical output signal N of the detector 7. The pulse rate, i.e. the number of electrical pulses detected per unit time, is a measure for the radiation intensity.

Connected to the detector 7 is a measuring device electronics 15, which serves for producing, on the basis of the electrical output signal N of the detector 7, the measurement signal M.

Energy supply of the radiometric measuring device occurs exclusively via a single line-pair 17 connected to the measuring device electronics 15. Via line-pair 17, the measuring device is connectable to a superordinated unit. Via this line-pair 17, also the measurement signal M generated by the measuring device electronics 15 is made available by the measuring device.

For this, preferably one of the two standards set forth above for 2-wire measuring devices is applied, i.e. the measuring device controls either an electrical current flowing via the line-pair 17 to a value, which corresponds to the present measurement result, or the measuring device is connected to a bus line and the measurement signal M is output in the form of a bus signal corresponding to one of the standards usual for this, such as e.g. Profibus or Foundation Fieldbus.

Figure 2:
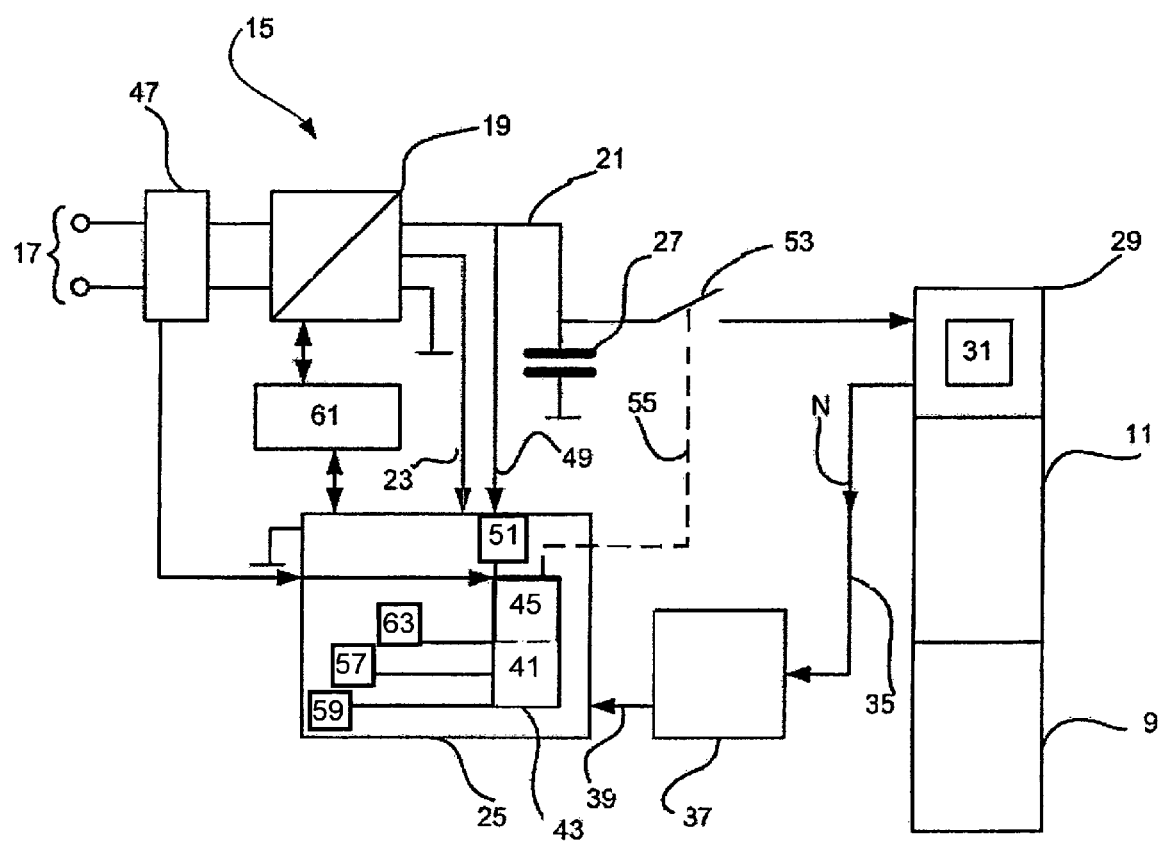
FIG. 2 shows a circuit diagram of an radiometric measuring device of the invention.

FIG. 2 shows a circuit diagram of the radiometric measuring device of the invention, in which the detector 7, the thereto connected measuring device electronics 15 and the line-pair 17 are presented.

The measuring device electronics 15 includes, connected to the line-pair 17, a power supply 19, which supplies energy via a first energy supply path 21 to the photomultiplier 11 and via a second energy supply path 23 to a measuring, and control, circuit 25. Applied in the first energy supply path 21 is an energy storer 27, which is fed with energy from the line-pair 17 via the power supply 19. In the illustrated example of an embodiment, the energy storer 27 is a capacitor connected to ground or to a circuit zero point (circuit ground), which is chargeable via the first energy supply path 21.

Figure 3:
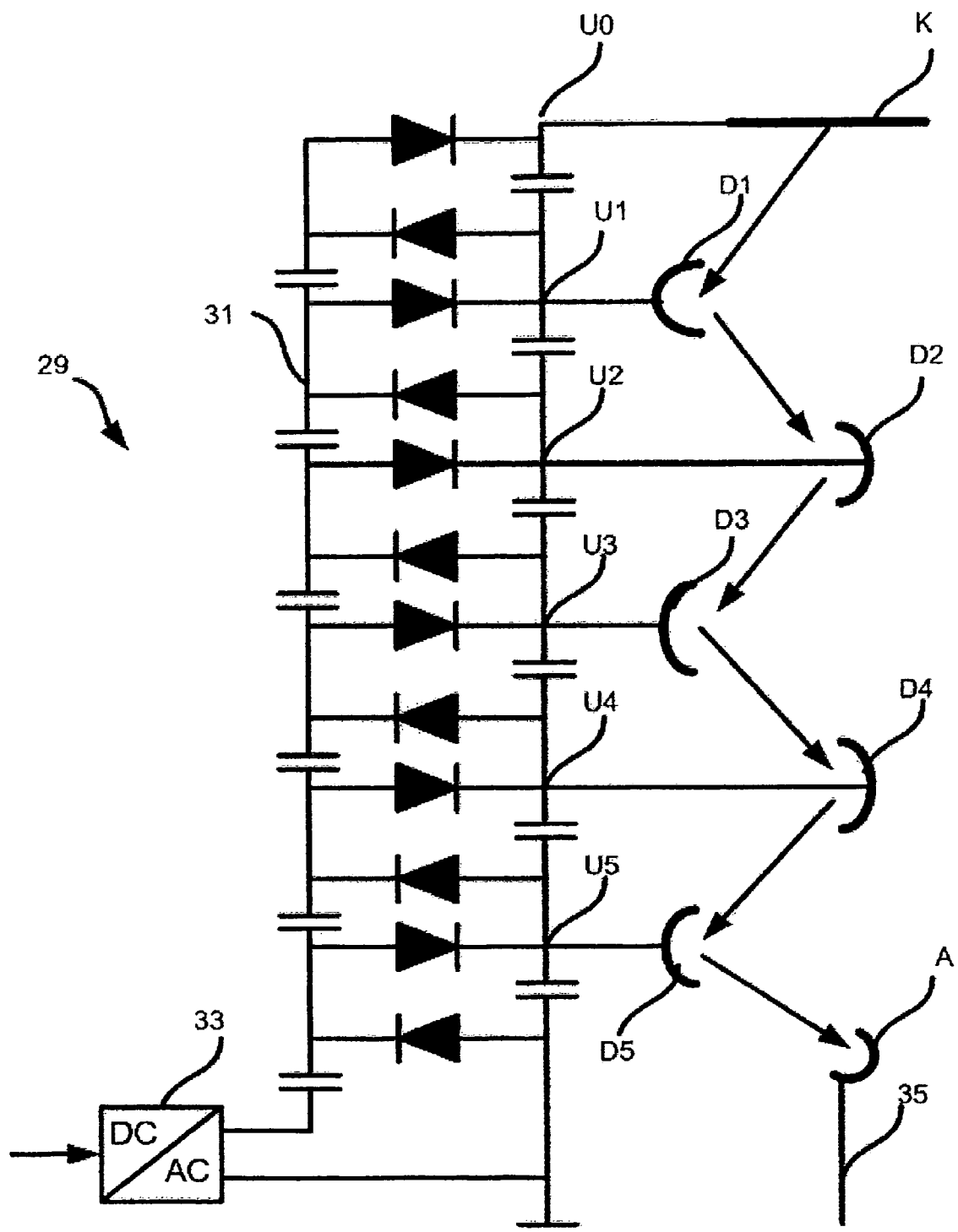
FIG. 3 shows a high voltage cascade connected to dynodes of the photomultiplier.

For producing the high voltages required for operating the photomultiplier 11, a high voltage producing circuit 29 is provided, which generates the required voltages by means of a high voltage cascade 31. FIG. 3 shows example of an embodiment, for this. The high voltage producing circuit 29 includes, input side, a DC/AC converter 33, which is connected to the first energy supply path 21 via a tap arranged between the energy storer 27 and the power supply 19. The DC/AC converter 33 generates an alternating voltage, with which the high voltage cascade 31 is operated. High voltage cascades are circuits, which, by multiplication and rectification of an alternating voltage, produce high direct voltages. They are known in the literature, for example, under the name Cockcroft-Walton circuit or Villard multiplier circuit and are based on a Villard circuit, which, for this, is multiply connected one after the other, thus cascaded. Each of the cascaded Villard circuits includes two capacitors and two diodes, which are interconnected with one another in the illustrated manner. The functional principle of this high voltage cascade 31 is known from the literature, and, consequently, not described here in detail. FIG. 3 shows a six-stage, high voltage cascade 31, which is constructed from six cascaded Villard circuits. On each stage, a voltage tap U0, U1, U2, U3, U4, U5 is provided. The uppermost voltage tap U0 is connected with a cathode K of the photomultiplier 11, on which, in measurement operation, the light flashes produced in the scintillator 9 by the radioactive radiation impinge. The additional voltage taps U1, U2, U3, U4, U5 are, in each case, connected with a dynode D1, D2, D3, D4, D5 of the photomultiplier 11. Photoelectrons released from the cathode K by the light pulses are accelerated and multiplied in the electrical fields lying between the dynodes D1, D2, D3, D4, D5. Then, they impinge on the anode A connected after the last dynode D5 and flow via an analog pulse line 35 connected to the anode A in the form of electrical current pulses. The analog output signal of the anode A forms therewith the analog output signal N of the detector 7. The output signal N is fed to the measuring device electronics 15 via the analog pulse line 35 and a trigger circuit 37 connected thereafter, which digitizes the analog output signal N and forwards it via a digital pulse line 39 in the form of pulses P to a digital signal processor 41. The digital signal processor 41 is, in the here illustrated example of an embodiment, a component of the measuring, and control, circuit 25. Core element of the measuring, and control, circuit 25 is preferably a microcontroller 43, which also performs the function of the signal processor 41.

The measuring, and control, circuit 25 includes a controller 45, which, as a function of the energy available in measuring device via the line-pair 17 and the energy storer 27, triggers measuring phases, during which the measuring device measures the physical, measured variable.

For this, the available energy in the device is registered.

This is accomplished, for example, via a measurement circuit 47, which is connected to the line-pair 17 on the input side for measuring the available input electrical current and input voltage, and which provides the result to the measuring, and control, circuit 25.

Alternatively or supplementally, for this, the total energy available via the line-pair 17 and the energy storer 27 can be registered via an energy measurement line 49, via which the measuring, and control, circuit 25 is connected with a tap arranged between the power supply 19 and the energy storer 27 in the first energy supply path 21. The voltage applied to the energy measurement line 49 is a measure of the charge status of the energy storer 27, and is quantitatively registered via a corresponding voltage measuring circuit 51 integrated in measuring, and control, circuit 25 and made available to the controller 45.

The function of the controller 45 is preferably likewise assumed by the microcontroller 43 of the measuring, and control, circuit 25.

In a first variant of the invention, the available incoming energy is measured via the measurement circuit 47, and the controller 45 specifies, as a function of the available, entering energy, measuring phases, during which the radiometric measuring device measures. During measuring pauses, the energy storer 27 is charged. In this case, the energy available in the energy storer 27 supplementally to the entering energy is derived, for example, on the basis of electrical current and voltage of the entering energy and the charging and discharging, characteristic curves of the energy storer 27 and taken into consideration in the triggering of the measuring phases and the dimensioning of the durations of the measuring phases and the measuring pauses. In such case, the measuring phases have, for example, a fixed, predetermined duration. They are, for example, directly initiated, as soon as the incoming energy together with that currently available in the energy storer 27 is sufficient therefor.

In a second variant, the triggering and the duration of the measuring phases and the measuring pauses are established on the basis of the total energy registered via the energy measurement line 49 and available internally, as a whole, via the line-pair 17 and the energy storer 27. Also here the measuring phases have, for example, a fixed predetermined duration, and they are, for example, initiated, when the incoming energy together with that currently available in the energy storer 27 are sufficient therefor.

In a third variant, the measuring phases and the measuring pauses are established as a function of the energy stored in the energy storer 27. The stored energy can, in the illustrated example of an embodiment, be derived, for example, on the basis of the voltage across the capacitor, lying via the energy measurement line 49 on the measuring, and control, circuit 25 and measured by means of the voltage measuring circuit 51. If the stored energy is above a predetermined upper threshold value, then the controller 45 initiates a measuring phase. The duration of the measuring phase can be either fixedly predetermined, or depend on the charge status of the energy storer 27. In the second case, the controller 45 ends the measuring phase, when the stored energy subceeds, or falls beneath, a predetermined lower threshold value. The duration of the measuring pause following thereon is ascertained by the time required for the renewed charging of the energy storer 27.

The controller 45 operates the photomultiplier 11 exclusively during the measuring phases. This is effected, in the illustrated example of an embodiment, by an interrupter contact 53 installed in the first energy supply path 21 between the energy storer 27 and the high voltage producing circuit 29. Interrupter contact 53 is operated by the controller 45 via a control line 55. During the measuring phases, the interrupter contact 53 is closed and the photomultiplier 11 is supplied with energy via the energy currently available via the line-pair 17 and the energy available in the energy storer 27. During the measuring phase, the application of the high voltage cascade 31 effects, that only very low energy losses occur, since, in contrast with the initially referenced resistance dividers, practically no cross currents flow in the circuit. During the measuring pauses, the high voltage producing circuit 29 (and therewith also the photomultiplier 11) is switched off and consumes no energy. In this time, the energy storer 27 is charged via the energy available via the line-pair 17. If again sufficient energy is available, the controller 45 can initiate the next measuring phase. This can last, until the available energy sinks below a predetermined limit value. Then, by the opening of the interrupter contact 53, the next measuring pause can be initiated. The high voltage cascade 31 offers the advantage that it can be switched very rapidly on and off, since it has only very low, internal capacitances.

For additional energy saving, the microcontroller 43 is preferably switched off during the measuring pauses, or operated with a reduced clocking rate.

During the measuring phases, the digital signal processor 41 ascertains, on the basis of the entering pulses P, the physical, measured variable. For this, a pulse rate of the entering pulses P is ascertained. Pulse rate is proportional to the radiation intensity and therewith to the physical, measured variable. The pulse rate is the number of pulses P entering per unit time, and is, for example, ascertained by means of a counter 57 and an internal clock 59 in the microcontroller 43.

Preferably, the duration of the measuring phases is dimensioned in such a manner that during a measuring phase at least a predetermined minimum number of pulses P enters and is available for determining the pulse rate. In this way, statistical error arising in the determining of the pulse rate can be limited.

The measuring device electronics 25 generates a measurement signal M corresponding to the measured radiation intensity and makes this available via the line-pair 17. This occurs, in the illustrated example of an embodiment, via a transmitter 61, such as e.g. a modem, inserted between the power supply 19 and the measuring, and control, electronics 25.

In a first variant, the measurement signal M is output, as above described, in the form of a bus signal and the transmitter 61 is a bus modem, which cares for the communication via the line-pair 17 embodied as a data bus conductor. At the same time, naturally also the energy supply of the total device occurs via the data bus conductor.

In a second variant of the invention, the measurement signal M is an electrical current I, which varies as a function of the measured value between a minimum current $I_{min}$ and a maximum current $I_{max}$. In this case, the power supply 19, controlled by the transmitter 61, sets an electrical current I flowing via the line-pair 17. This electrical current I corresponds to the measured value of the physical, measured variable to be measured. This electrical current I is provided by the superordinated unit (not shown) connected here to the measuring device, and delivers the energy supply, with which the entire measuring device is operated.

In the case of this variant, the duration of the measuring phases is preferably based on the electrical current I representing the measurement signal. In such case, the electrical current I varies, as a function of the measured value, between the minimum current $I_{min}$ and the maximum current $I_{max}$, and the duration of the measuring phases increases with increasing electrical current I.

Preferably, also the ratio of the duration of the measuring phases to the duration of the measuring pauses is matched to the electrical current I, so that the duration of the measuring phases relative to the duration of the measuring pauses increases with increasing electrical current I.

The ratio of the duration of the measuring phases referenced to the duration of the measuring pauses is referred to as duty cycle. This ratio is varied by means of the controller 45 as a function of the available energy. Typically, the duty cycle lies, dependent on the energy available via the line-pair 17 between 20% and 100%.

To the extent that sufficient energy is available, the measuring device is preferably operated continuously with a duty cycle of 100%. For this, for example, procedure is such, that the available input voltage is measured e.g. with the measurement circuit 47, and compared with a minimum voltage required for continuous operation of the measuring device. If the input voltage exceeds the minimum voltage required for continuous operation, then the controller 45 initiates a measuring phase, which it then ends, only when the input voltage sinks below the minimum voltage.

Each radiometric measuring device has a measuring range for the physical, measured variable to be measured, for which the measuring device is designed. In the case of fill level measurement, the measuring range is, for example, bounded by a minimum fill level $L_{min}$ and a maximum fill level $L_{max}$. In the case of a classic fill level measurement, the radioactive radiation is absorbed by the fill substance 1 in the container 3. Therewith, in the case of a full container 3, a low radiation intensity falls on the detector 7, while, in the case of an empty container 3, a markedly higher radiation intensity falls on the detector 7.

In the case of density measurement, the measuring range is bounded e.g. by minimum and maximum densities. Here, analogously, in the case of fill substances with high density, a smaller radiation intensity falls on the detector 7 than in the case of fill substances with a lower density.

Preferably, for output of the measurement results, procedure is such that associated with the minimum current $I_{min}$ is that measured value, at which, within the predetermined measuring range of the measuring device, the highest radiation intensity is present. Referenced to the initially described standard for 2-wire measuring devices, this means that, for example, associated with the minimum fill level $L_{min}$ is an electrical current value of 4 mA and associated with the maximum fill level $L_{max}$ is an electrical current value of 20 mA.

This offers the advantage, that, for measuring lower radiation intensities, more energy is available than for measuring higher radiation intensities. Correspondingly, lower radiation intensities can be measured during longer measuring phases, or with a higher duty cycle, than the higher radiation intensities.

The pulse rate to be measured in the case of high radiation intensities is higher than in the case of low radiation intensities. Correspondingly, a statistical measurement error arising in the case of determining the pulse rate at high radiation intensities is smaller than in the case of low radiation intensities. The statistical fluctuations of the pulse rate can be further reduced by special digital filters, such as e.g. Kalman filters or median filters. In the case of the example of an embodiment illustrated in FIG. 2, for this, a digital filter 63 is provided associated with the signal processor 41. A number of individual values of pulse rates measured one after the other are input as input values into the filter function. The filter weights the individual values differently and ascertains, thereafter, the average value, or the average value of the totality, of the individual values. The longer the measuring phases last, the higher the number of individual values can be selected, which are taken into consideration for determining the pulse rate. In this way, the statistical error is reduced. This positive effect is larger, the smaller the pulse rate to be measured is.

For radiometric measuring devices of the invention, in the case of which the measurement signal M is an electrical current I, which varies between a minimum current $I_{min}$ and a maximum current $I_{max}$ as a function of the measured value, the electrical current I is, at turn-on of the measuring device, preferably controlled to the maximum current I. In this way, the turn-on procedure, wherein also the energy storer 27 is charged, is kept as short as possible.

During calibration, the electrical current I is preferably controlled to a value of more than 20.5 mA, especially to 22 mA. An electrical current value of 22 mA for 2-wire measuring devices is, according to standard, considered an error current, and offers, in the case of the 2-wire device of the invention, the advantage, that much energy is available in the device during calibration.

In the case of the presence of a device error, the electrical current is controlled to a value of less than 3.8 mA, especially to 3.6 mA, which is likewise considered, according to standard for this, to indicate error. According to the invention, the controller 45 effects, during the presence of a device error, a measuring pause lasting for the duration of the presence of the device error.

The invention claimed is:

1. A radiometric measuring device for measuring a physical, measured variable of a fill substance located in a container and for outputting a measurement signal corresponding to a measured value of the physical, measured variable, wherein the device has available a single line-pair, via which energy supply of the total measuring device occurs, and via which transmission of measurement signals occurs, the device, comprises:

a radioactive radiator, which, during operation, sends radioactive radiation through the container;

a detector having a scintillator and a photomultiplier, and serving for detecting, and for converting into an electrical output signal, radiation intensity penetrating through the container dependent on the physical, measured variable to be measured;

a measuring device electronics, which serves for producing the measurement signal on the basis of the electrical output signal of said detector and for making the measurement signal available via said line-pair;

an energy storer supplied with energy via said line-pair;

a high voltage cascade produces a high voltage required for operating said photomultiplier during the measuring phases;

a controller, which measure the total energy available via said line-pair and said energy storer on the basis of electrical current and voltage of the effective entering energy via said line-pair and the charging and discharging, characteristic curves of the energy storer, which triggers a measuring phase, as a function of said total energy available via the line-pair and said energy storer, during which the measuring device measures the physical, measured variable over said measuring phase, and which operates said photomultiplier and said high voltage cascade and switched off said high voltage cascade and therewith also the photomultiplier during measuring pauses and consumes no energy.

2. The radiometric measuring device as claimed in claim 1, further comprising:

a measurement circuit connected to said line-pair, which measures available input electrical current and input voltage.

3. The radiometric measuring device as claimed in claim 1, further comprising:

an energy measurement line, via which energy available internally in the measuring device via said line-pair and said energy storer is registered.

4. The radiometric measuring device as claimed in claim 1, wherein:
   a charge status of said energy storer is registered, and the measuring phases are triggered as a function of the charge status of said energy storer.

5. The radiometric measuring device as claimed in claim 1, wherein:
   said measuring device electronics includes a microcontroller, which is switched off, or operated with a reduced clocking rate, during measuring pauses.

6. The radiometric measuring device as claimed in claim 1, wherein:
   the measurement signal is an electrical current, which varies between a minimum current and a maximum current as a function of the measured value; and
   associated with the minimum current is that measured value, at which highest radiation intensity is present within a predetermined measuring range of the measuring device.

7. The radiometric measuring device as claimed in claim 1, wherein:
   the measurement signal is an electrical current, which varies between a minimum current and a maximum current as a function of the measured value; and
   the ratio of duration of the measuring phases to the duration of the measuring pauses increases with increasing electrical current.

8. The radiometric measuring device as claimed in claim 1, wherein:
   the measurement signal is an electrical current, which varies between a minimum current and a maximum current as a function of the measured value; and
   the duration of measuring phases increases with increasing electrical current.

9. The radiometric measuring device as claimed in claim 1, wherein:
   the measurement signal is a bus signal.

10. The radiometric measuring device as claimed in claim 1, wherein:
    a counter is provided, which counts pulses produced by said photomultiplier; and
    the duration of measuring phases is dimensioned in such a manner that, during a measuring phase, at least a predetermined minimum number of pulses is produced.

11. A method for operation of a radiometric measuring device comprising a radiometric measuring device for measuring a physical, measured variable of a fill substance located in a container and for outputting a measurement signal corresponding to a measured value of the physical, measured variable, wherein the device has available a single line-pair, via which energy supply of the total measuring device occurs, and via which transmission of measurement signals occurs, the device, comprises:
    a radioactive radiator, which, during operation, sends radioactive radiation through the container;
    a detector having a scintillator and a photomultiplier, and serving for detecting, and for converting into an electrical output signal, radiation intensity penetrating through the container dependent on the physical, measured variable to be measured;
    a measuring device electronics, which serves for producing the measurement signal on the basis of the electrical output signal of said detector and for making the measurement signal available via said line-pair;
    an energy storer supplied with energy via said line-pair; and
    a controller, which triggers, as a function of energy available via the line-pair and said energy storer, measuring phases, during which the measuring device measures the physical, measured variable, and which places said photomultiplier in operation exclusively during the measuring phases, wherein: high voltage required for operating said photomultiplier during the measuring phases is produced by means of a high voltage cascade;
    the method comprising the steps of:
    generating a measurement signal, an electrical current, which varies between a minimum current and a maximum current as a function of the measured value; and
    controlling the electrical current at turn-on of the measuring device to the maximum current.

12. A method for the operation of a radiometric measuring device comprising a radiometric measuring device for measuring a physical, measured variable of a fill substance located in a container and for outputting a measurement signal corresponding to a measured value of the physical, measured variable, wherein the device has available a single line-pair, via which energy supply of the total measuring device occurs, and via which transmission of measurement signals occurs, the device, comprises:
    a radioactive radiator, which, during operation, sends radioactive radiation through the container;
    a detector having a scintillator and a photomultiplier, and serving for detecting, and for converting into an electrical output signal, radiation intensity penetrating through the container dependent on the physical, measured variable to be measured;
    a measuring device electronics, which serves for producing the measurement signal on the basis of the electrical output signal of said detector and for making the measurement signal available via said line-pair;
    an energy storer supplied with energy via said line-pair; and
    a controller, which triggers, as a function of energy available via the line-pair and said energy storer, measuring phases, during which the measuring device measures the physical, measured variable, and which places said photomultiplier in operation exclusively during the measuring phases, wherein: high voltage required for operating said photomultiplier during the measuring phases is produced by means of a high voltage cascade;
    the method comprising the steps of:
    generating measurement signal as an electrical current, which varies between a minimum current and a maximum current as a function of the measured value; and
    controlling the electrical current in calibration operation to a value of greater than 20.5 mA.

13. A method for the operation of a radiometric measuring device as claimed in claim 12, wherein the error value of the electrical current (I) is 3.6 mA.

14. A method for the operation of a radiometric measuring device comprising a radiometric measuring device for measuring a physical, measured variable of a fill substance located in a container and for outputting a measurement signal corresponding to a measured value of the physical, measured variable, wherein the device has available a single line-pair, via which energy supply of the total measuring device occurs, and via which transmission of measurement signals occurs, the device, comprises:
    a radioactive radiator, which, during operation, sends radioactive radiation through the container;
    a detector having a scintillator and a photomultiplier, and serving for detecting, and for converting into an electrical output signal, radiation intensity penetrating through the container dependent on the physical, measured variable to be measured;

a measuring device electronics, which serves for producing the measurement signal on the basis of the electrical output signal of said detector and for making the measurement signal available via said line-pair;

an energy storer supplied with energy via said line-pair; and a controller, which triggers, as a function of energy available via the line-pair and said energy storer, measuring phases, during which the measuring device measures the physical, measured variable, and which places said photomultiplier in operation exclusively during the measuring phases, wherein: high voltage required for operating said photomultiplier during the measuring phases is produced by means of a high voltage cascade;

the method comprising the steps of:

generating a measurement signal as an electrical current, which varies between a minimum current and a maximum current as a function of the measured value;

controlling the electrical current, in the case of the presence of a device error, to an error value of less than 3.8 mA; and effecting a measuring pause by the controller, during the presence of a device error, lasting for the duration of the presence of the device error.

15. A method for the operation of a radiometric measuring device as claimed in claim 14, wherein the electrical current in calibration operation is 22 mA.

16. A method for the operation of a radiometric measuring device, comprising:

a radiometric measuring device for measuring a physical, measured variable of a fill substance located in a container and for outputting a measurement signal corresponding to a measured value of the physical, measured variable, wherein the device has available a single line-pair, via which energy supply of the total measuring device occurs, and via which transmission of measurement signals occurs, the device, comprises:

a radioactive radiator, which, during operation, sends radioactive radiation through the container;

a detector having a scintillator and a photomultiplier, and serving for detecting, and for converting into an electrical output signal, radiation intensity penetrating through the container dependent on the physical, measured variable to be measured;

a measuring device electronics, which serves for producing the measurement signal on the basis of the electrical output signal of said detector and for making the measurement signal available via said line-pair;

an energy storer supplied with energy via said line-pair; and a controller, which triggers, as a function of energy available via the line-pair and said energy storer, measuring phases, during which the measuring device measures the physical, measured variable, and which places said photomultiplier in operation exclusively during the measuring phases, wherein: high voltage required for operating said photomultiplier during the measuring phases is produced by means of a high voltage cascade;

the ratio of duration of measuring phases to duration of measuring pauses lies between 20% and 100% as a function of available energy.

17. A method for the operation of a measuring device comprising:

a radiometric measuring device for measuring a physical, measured variable of a fill substance located in a container and for outputting a measurement signal corresponding to a measured value of the physical, measured variable, wherein the device has available a single line-pair, via which energy supply of the total measuring device occurs, and via which transmission of measurement signals occurs, the device, comprises:

a radioactive radiator, which, during operation, sends radioactive radiation through the container;

a detector having a scintillator and a photomultiplier, and serving for detecting, and for converting into an electrical output signal, radiation intensity penetrating through the container dependent on the physical, measured variable to be measured;

a measuring device electronics, which serves for producing the measurement signal on the basis of the electrical output signal of said detector and for making the measurement signal available via said line-pair;

an energy storer supplied with energy via said line-pair; and a controller, which triggers, as a function of energy available via the line-pair and said energy storer, measuring phases, during which the measuring device measures the physical, measured variable, and which places said photomultiplier in operation exclusively during the measuring phases, wherein: high voltage required for operating said photomultiplier during the measuring phases is produced by means of a high voltage cascade;

comprising the steps of:

measuring the available input voltage;

comparing the input voltage with a minimum voltage required for continuous operation of the measuring device; and triggering a measuring phase by the controller, upon exceeding of the minimum voltage, which ends, only once the input voltage sinks below the minimum voltage.

* * * * *